(12) United States Patent
Konrad et al.

(10) Patent No.: US 7,010,366 B2
(45) Date of Patent: Mar. 7, 2006

(54) FIELD DEVICE WITH DISPLAY

(75) Inventors: Michael Konrad, Kempten (DE);
Dieter Schmidt, Nesselwang (DE)

(73) Assignee: Endress & Hauser Wetzer GmbH & Co. KG, Nesselwang (DE)

( * ) Notice: Subject to any disclaimer, the term of this patent is extended or adjusted under 35 U.S.C. 154(b) by 511 days.

(21) Appl. No.: 10/189,000

(22) Filed: Jul. 5, 2002

(65) Prior Publication Data

US 2003/0006989 A1  Jan. 9, 2003

Related U.S. Application Data

(60) Provisional application No. 60/317,439, filed on Sep. 7, 2001.

(30) Foreign Application Priority Data

Jul. 6, 2001  (EP) .................................. 01116427

(51) Int. Cl.
*G05B 15/00* (2006.01)

(52) U.S. Cl. ............................ 700/83; 700/9; 700/108; 700/204; 700/115; 700/96; 700/112; 700/110; 709/106; 707/10

(58) Field of Classification Search ................ 700/115, 700/96, 108, 112, 110, 83, 9, 204; 709/106; 707/10

See application file for complete search history.

(56) References Cited

U.S. PATENT DOCUMENTS

| 5,206,818 | A | * | 4/1993 | Speranza ...................... 702/24 |
| 5,479,359 | A | * | 12/1995 | Rogero et al. ................ 702/24 |
| 5,839,094 | A | * | 11/1998 | French ......................... 702/91 |
| 6,026,352 | A | * | 2/2000 | Burns et al. ................. 702/182 |
| 6,064,372 | A | * | 5/2000 | Kahkoska .................... 345/173 |
| 6,212,937 | B1 | * | 4/2001 | Hubert et al. ................ 73/23.2 |
| 6,795,798 | B1 | * | 9/2004 | Eryurek et al. ............. 702/188 |
| 2004/0098218 | A1 | * | 5/2004 | Ito et al. ..................... 702/138 |

FOREIGN PATENT DOCUMENTS

| GB | 2 253 701 A | 9/1992 |
| GB | 2 318 982 A | 5/1998 |
| GB | 2 331 581 A | 5/1999 |

* cited by examiner

*Primary Examiner*—Anthony Knight
*Assistant Examiner*—Thomas Pham
(74) *Attorney, Agent, or Firm*—Bacon & Thomas

(57) ABSTRACT

A display (AV) for on-site visualization of conditions of an automated process (PZ) is disclosed. It comprises a display controller (AS) which at least temporarily provides a state indication signal (ZA) representing a constellation of states of at least two process data signals ($PD_1$, $PD_2$). At least one of the two process data signals ($PD_1$, $PD_2$) is derived from a signal (RX) generated externally to the field device ($F_1$). The field device ($F_1$) has a display element (AE) which responds to a change in the state indication signal (ZA) with a significant change in its appearance, thus signaling the constellation of the states of the two process data signals ($PD_1$, $PD_2$) in a visually perceptible manner. Therefore, the field device ($F_1$) is particularly suited for on-site monitoring of entire plants or sections thereof by operating personnel.

46 Claims, 2 Drawing Sheets

FIELD DEVICE WITH DISPLAY

This application is based on Provisional Application, filed Sep. 7, 2001, as application 60/317,439

FIELD OF THE INVENTION

This invention relates to a field device with a display for on-site visualization of conditions of an automated process.

BACKGROUND OF THE INVENTION

The control and monitoring of automated processes in the chemical, pharmaceutical, process, and other industries is increasingly being effected from control rooms, to which large amounts of process data generated within the respective plant are transmitted, e.e., via field buses.

To generate such process data, use is commonly made of a large number of field devices installed at or in the immediate vicinity of the process, such as measuring instruments, control equipment, and/or data storage devices, which can supply the corresponding measured and/or control variables in the form of standardized analog or digital signals.

In spite of the fact that the interpretation of process data is nowadays performed essentially with the aid of computers, particularly remote from the field, operative on-site monitoiing, i.e., monitoring by operating personnel in the plant, is often necessary and usually prescribed. Therefore, such process data generated in the field will continue to be visualized not only in control. rooms but also directly at the field devices providing these process data, particularly in fully automated plants.

For the on-site visualization of individual process data, different types of display elements, such as bar-graph or digital displays, particularly liquid crystal displays, have proved effective. Also, display elements of the kind known from pointer instruments are still being widely used. Aside from the on-site visualization of the measured variable proper, commercially available field devices often provide for on-site visualization of selected field device data, such as device error messages or parameters representing current device configurations.

A problem associated with such on-site operative monitoring is that, on the one hand, the process data necessary in the increasingly complex plants for the description of the conditions to be monitored are increasing in volume, while, on the other hand, an interpretation of the process data in the sense of an assignment to one of the conditions to be monitored can be performed "manually" by operators on site only for process data sets of small volume.

Aside from the fact that such process data sets are frequently much too large for comprehensive on-site operative monitoring, fast, particularly simultaneous, visual perception of the relevant data by operating personnel is often not possible since the respective field devices and, thus, their display elements are generally far apart, so that they cannot be viewed simultaneously.

SUMMARY OF THE INVENTION

Against this background, namely that, on the one hand, data of an automated process are increasingly being used to monitor plants or sections thereof on site as completely as possible while, on the other hand, simultaneous perception and interpretation of all process data representing the respective condition of the plant has so far been possible on site only conditionally, the invention has for its object to provide a field device with a display whereby such conditions can be signaled to operating personnel acting on site in a visually easily perceptible manner, thus making automated processes easier accessible to on-site operative monitoring.

To attain this object, the invention consists in a field device with a display for on-site visualization of conditions of an automated process, said display comprising:

a display controller
which receives at least a first process data signal and a second process data signal and
which at least temporarily provides a state indication signal representing a constellation of states of at least one of the two process data signals,
at least one of the two process data signals being derived from an external signal generated externally to the field device; and a display element of variable appearance
which visually signals via its appearance a constellation of the states of the two process data signals, and
which responds to a change in the state indication signal with a significant change in its appearance.

In a first preferred embodiment of the invention, the display controller at least temporarily provides a value indication signal representing an instantaneous value of one of the two process data signals, and the display element responds to the value indication signal by at least temporarily presenting this signal value in a visually perceptible manner.

According to a first preferred development of the invention, one of the two process data signals is derived from a transducer signal generated inside the field device.

In a second preferred embodiment of the invention, the display element comprises a light-emitting means of adjustable hue for illuminating a display background, and the display element responds to the state indication signal by causing the light-emitting means to illuminate the display background in a hue which signals the condition currently being represented by the state indication signal.

According to a second preferred development of the invention, the light-emitting means illuminates the display background in a hue which was selected from a store of discrete hue values by means of the state indication signal.

In a third preferred embodiment of the invention, the external signal is fed to the field device through a communications interface.

A fundamental idea of the invention is, in addition to or instead of providing a conventional on-site indication of individual process data, particularly of measured or control variables, to signal constellations of states of two or more process data signals, and thus individual ones of a plurality of predefined conditions, including error or alarm conditions, of the process to be monitored, on site in a visually perceptible manner.

The invention is predicated on recognition that because of increasingly complex process structures and sequences of process steps along with predominantly automated evaluation, particularly evaluation performed "remote from the field", checks to be performed by operating personnel on site will be made less and less with a view to fulfilling control tasks designed to operate the plant in an optimum condition. In future, such checks will rather be increasingly performed in order to monitor the plant as a whole also on site and thus detect any critical or hazardous conditions in individual sections of the plant as early as possible. This will then permit fast initiation of suitable countermeasures, particularly intervention by operating personnel acting on site.

By a condition-dependent colored illumination of the respective background of display elements commonly used in such field devices, the process conditions can be signaled so as to be clearly visible to operating personnel in a very advantageous manner, even from a great distance.

The invention will become more apparent from the following description of embodiments taken in conjunction with the accompanying drawings. Like reference characters have been used to designate like elements throughout the various figures of the drawings; previously used references characters have not been repeated in subsequent figures if this contributes to clarity.

BRIEF DESCRIPTION OF THE DRAWINGS

Referring to FIGS. 1 and 2, there is shown a field device $F_1$ which, according to the invention, serves to visualize conditions of a process PZ, particularly of an automated process, on site. Field device $F_1$, as indicated in FIG. 1, may be a device which is installed in a plant implementing the process PZ and which senses at least a first physical or chemical process variable $PV_1$, such as a level meter, a mass flowmeter, a pH meter, a pressure gage, or a limit detector. However, field device $F_1$ may also be a data recording device installed on site, i.e., in the plant, or an actuator acting on the process PZ, such as a valve or a pump.

Preferably, field device $F_1$ is connected to a field bus FB, particularly a serial field bus, via which it communicates with a stored-program control located close to the field, with a control room, or with other field devices. Therefore, field device $F_1$ includes a communications interface COM which serves to couple the device to field bus FB and is adapted to the respective communications protocol used.

For on-site visualization of process conditions, field device $F_1$ comprises a display AV with a display element AE of variable optical appearance and with a display controller AS for display element AE.

Display controller AS serves to generate from a first process data signal $PD_1$ and at least a second process data signal $PD_2$ a state indication signal ZA, preferably a discrete signal, which controls the display element AE and represents an instantaneous constellation of the states of the two process data signals $PD_1$, $PD_2$.

Figure 1:
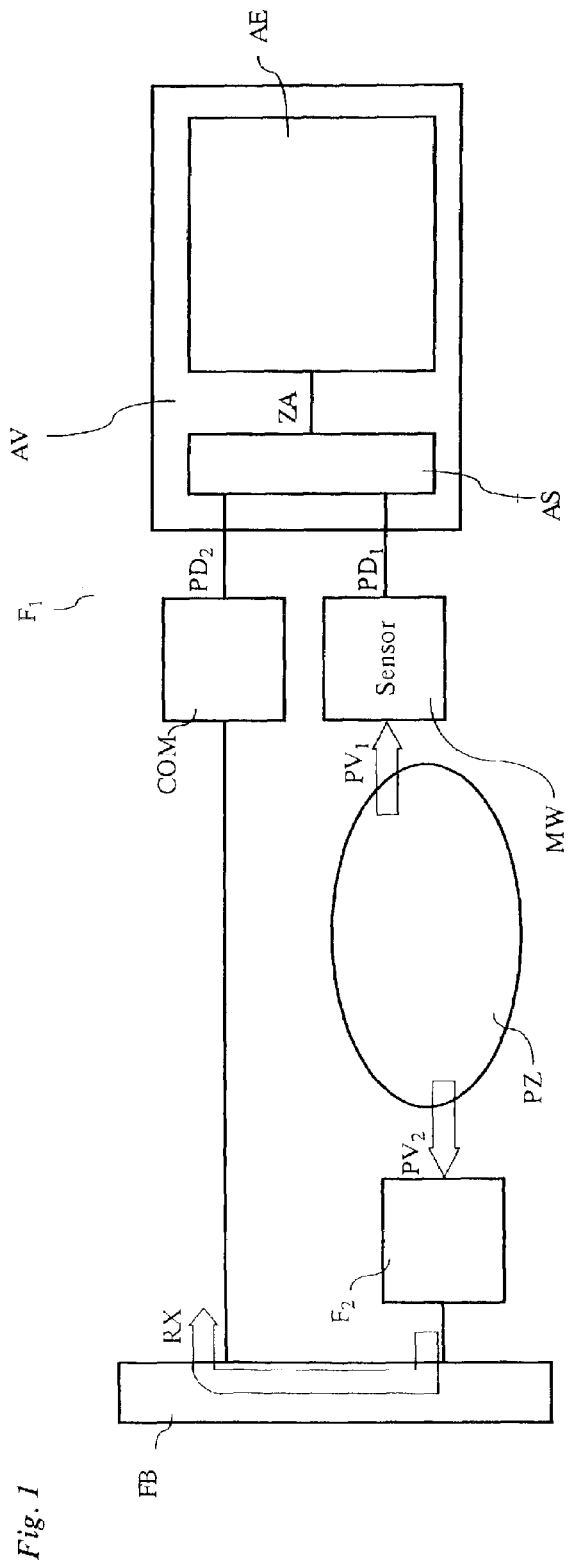
FIG. 1 shows schematically a field device for processing at least two process data signals.

According to the invention, at least one of the at least two process data signals $PD_1$, $PD_2$ is derived from an externally generated signal RX, particularly from a signal generated by a second field device $F_2$. As shown schematically in FIG. 1, the external signal RX may also be, for example, a measurement signal provided by the second field device $R_2$ and representing a second process variable $PV_2$, which measurement signal is transmitted via field bus FB to the first field device $F_1$, where it is converted by communications interface COM to the process data signal to be processed, $PD_2$.

In a preferred embodiment of the invention, the first process data signal $PD_1$ is a signal generated by means of a transducer MW of field device F1 and representing the first process variable $PV_1$. If field device $F_1$ is an actuator, process data signal $PD_1$ may also be a control signal generated by a control element of field device $F_1$, for example.

Figure 3:
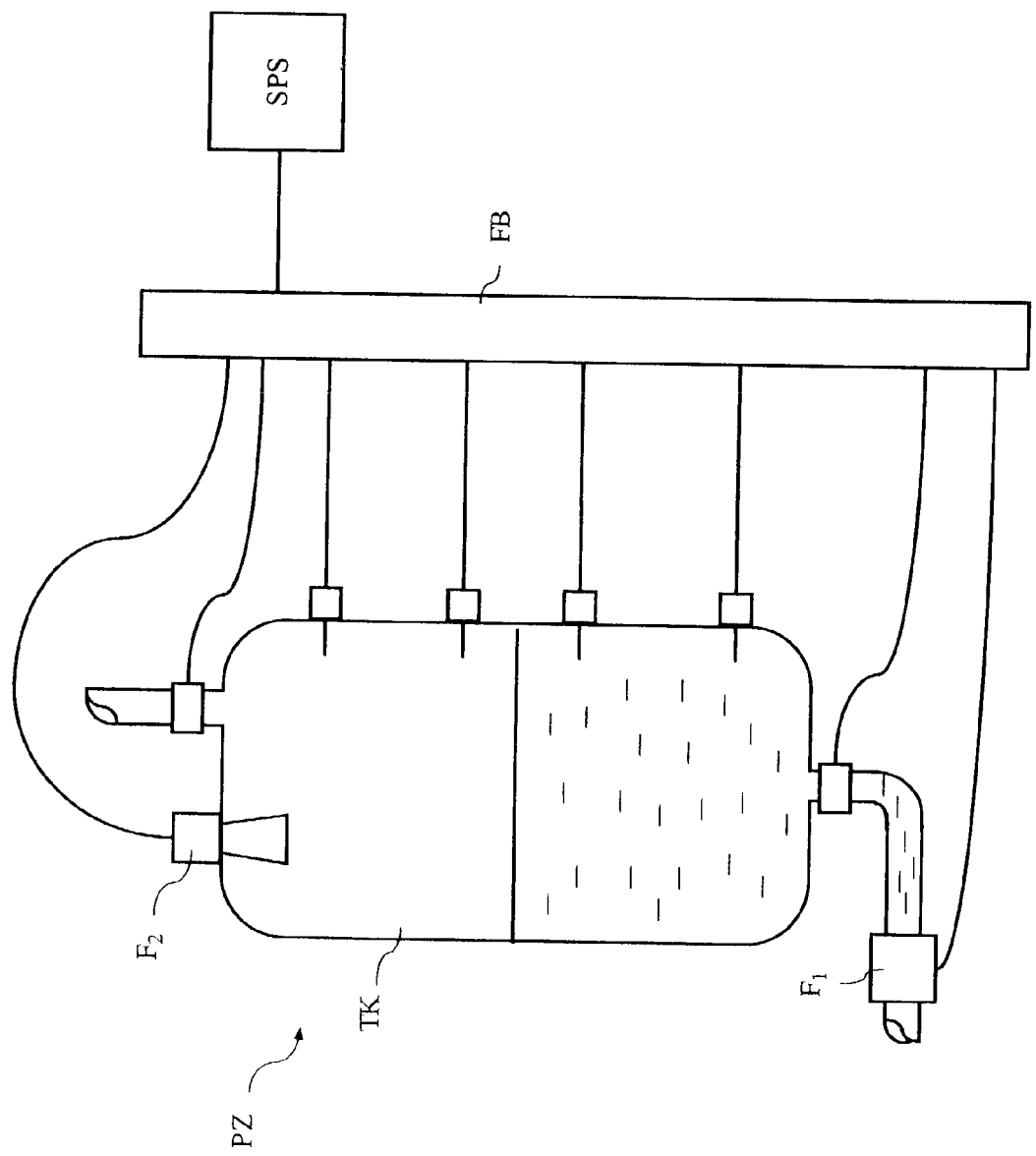
FIG. 3 shows schematically an application of the field device of FIG. 1.

In the embodiment shown schematically in FIG. 3, the first field device $F_1$ is a mass flowmeter which can be mounted on a discharge pipe of a liquid tank TK, and measures the mass flow rate of a liquid flowing through the pipe. A level meter mounted above a maximum tank level serves as a second field device $F_2$. Besides communicating with the second field device $F_2$, the first field device $F_1$, as shown schematically in FIG. 3, may exchange process data with, and particularly process further process data signals $Pd_m$ from, a plurality of further field devices.

For the plant section shown, an optimum condition could be defined, for example, when tank TK is filled up to between 30 and 80% and neither inflow nor outflow of liquid is being sensed. Further constellations representative of the optimum process condition could be signaled, for example, when outflow is being sensed and tank TK is filled up to at least 40%, or when inflow is being sensed and tank TK is filled up to a maximum of 60%. By contrast, a critical condition could be defined, for example, for a liquid level above 90% with no inflow being sensed or for a liquid level of less than 20% with no outflow being sensed. Also, a condition in which tank TK is filled up to 80% and inflow is being sensed or in which tank TK is filled to less than 20% and outflow is being sensed, for example, could be a critical condition. An overcritical or alarm condition for the plant section shown would have to be signaled, for example, when tank TK is empty or nearly overfilled.

To generate the state indication signal, display controller AS comprises an evaluation stage AwS. The latter serves to perform a rule-based interpretation of an instantaneous constellation of states of the applied process data signals $PD_1$, $PD_2$, i.e., a translation of a set of instantaneous values of process data signals $PD_1$, $PD_2$ into a state value signal ZW representing the condition to be signaled. Such an interpretation of signal states may be accomplished with the aid of predefined interpretation or translation rules which are represented in evaluation stage AwS by means of suitable arithmetic units. The arithmetic units in evaluation stage AwS are advantageously implemented, for example, with a microcomputer and programs stored and executed therein. It may prove to be advantageous if the aforementioned interpretation rules can be adapted, e.g., from a control room via field bus FB, to any changes in the process.

To convert the state value signal ZW to the state indication signal ZA, display controller AS includes a driver stage TrS coupled to evaluation stage AwS.

Figure 2:
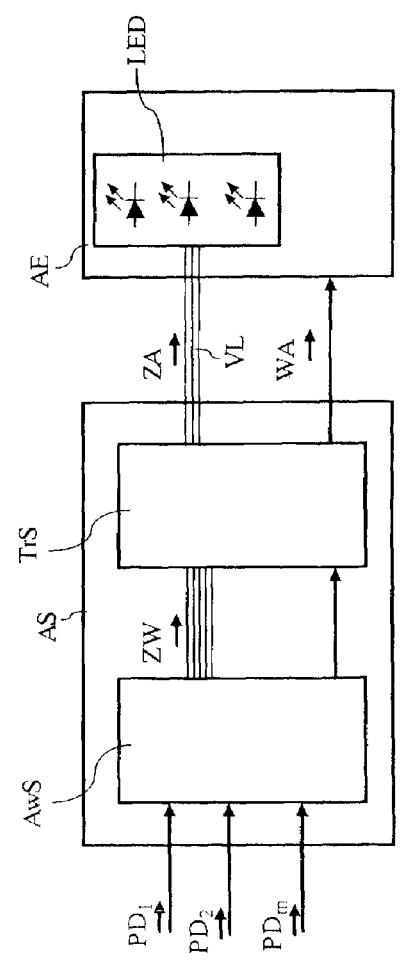
FIG. 2 shows schematically components of the field device of FIG. 1.

Preferably, driver stage TrS, as indicated schematically in FIG. 2, is connected via a set of n binary inputs to corresponding parallel binary outputs of evaluation stage AwS, which deliver an instantaneous value of state value signal ZW in the form of a simple digital word. A conceivable allocation of signal values to the individual process conditions could be as follows: a signal value of "100" for a detected optimum condition, a signal value of "010" for a detected critical condition, and a signal value of "001" for a detected overcritical condition.

The state indication signal ZA derived from the instantaneous value of the state value signal ZW may be generated by arranging that driver stage TrS selectively activates individual or two or more parallel supply lines VL for display element AE and thus influences the appearance of the latter in the manner described above. The state indication signal thus generated then corresponds to a respective pattern of currently activated supply lines VL.

The state indication signal ZA and the display element AE driven by it are so adapted to one another that display element AE responds to an essential change in the state indication signal ZA, i.e., to a change corresponding to a change in the process PZ from a previously existing condition to another condition, in a predeterminable manner with a significant change in its appearance.

For the display element AE, liquid crystal displays (LCDs) or thin-film transistor (TFT) displays may be used, for example, which are familiar to those skilled in the art. If necessary, display element AE may be of the type commonly used in pointer instruments, i.e., an element with a scale and a pointer driven by a movement, as is disclosed in EP-A 1 083 410, for example.

According to a further development of the invention, the change in the appearance of display element AE is implemented by causing the display element AE to light up, at least in segments, in a hue of adjustable value assigned to the respective condition to be signaled, the respective hue value being selected from a store of discrete hue values by means of the state indication signal. A conceivable color coding for the individual process conditions would be, for example, if the display element showed green upon detection of an optimum condition, yellow upon detection of a critical condition, and red upon detection of an overcritical condition. Instead of or in addition to a color-coded signaling of the process conditions, display element AE may present the current condition by outputting a correspondingly assigned designation and/or a correspondingly assigned index number in the form of a text message.

For the color-coded signaling of the current process condition, particularly to make the signaling visible from a great distance, in a further preferred embodiment of the invention, display element AE comprises a light-emitting means LED of adjustable hue. Light-emitting means LED preferably serves to illuminate a display background, particularly completely, in the hue that signals the condition currently being represented by state indication signal ZA. Particularly in that case, it is advantageous to use for the display element AE a liquid crystal display implemented in STN (Super Twisted Nematic), DSTN (Double Super Twisted Nematic), or CCSTN (Color Coded Super Twisted Nematic) technology. The background of display element AE may then be illuminated in the above-described manner with light-emitting means LED in the form of an array of differently colored light-emitting diodes or in the form of differently colored light-emitting films. Another embodiment of a suitable display element AE in the form of a liquid crystal display is described in the above-mentioned EP-A 1 083 410, for example.

According to a further advantageous development of the invention, display element AE is driven at least temporarily by a value indication signal WA which represents an instantaneous value of the second process data signal $PD_2$. Value indication signal WA is also provided by display controller AS, particularly by the driver stage TrS thereof, and serves to change the appearance of display element AE so that it presents the signal value in a visually perceptible manner. The representation of the instantaneous value of process data signal $PD_2$ may be implemented, for example, with the above-mentioned liquid crystal or TFT display or with the above-mentioned movement-driven pointer moving over the scale.

The generation of value indication signal WA and, hence, the display of the signal value may be initiated, for example, by on-site operating personnel via a suitable input interface, e.g., a keyboard communicating with display controller AS, particularly with evaluation stage AwS; cf. EP-A 1 079 291, in which a readout display unit with a display element is described which is incorporated in a field device but not connected to a field bus, and by which manually selected measured variables generated by different field devices can be displayed one after the other.

What is claimed is:

1. A field device with a display for on-site visualization of conditions of an automated process, the display comprising:
   a display controller which receives at least a first process data signal and a second process data signal, and which at least temporarily provides a state indication signal representing a constellation of states of at least the two process data signals;
   at least one of the two process data signals being derived from an external signal generated externally to the field device; and
   a display element of variable appearance which visually signals via its appearance a constellation of the states of the two process data signals, and which responds to a change in the state indication signal with a significant change in its appearance.

2. The field device as set forth in claim 1, wherein:
   said display controller at least temporarily provides a value indication signal representing an instantaneous value of one of the two process data signals; and
   said display element responds to said value indication signal by at least temporarily presenting this signal value in a visually perceptible manner.

3. The field device as set forth in claim 1, wherein:
   one of said two process data signals is derived from a transducer signal generated inside the field device.

4. The field device as set forth in claim 1, wherein:
   said display element comprises a light-emitting means of adjustable hue for illuminating a display background; and
   said display element responds to said state indication signal by causing said light-emitting means to illuminate the display background in a hue which signals the condition currently being represented by said state indication signal.

5. The field device as set forth in claim 4, wherein:
   said light-emitting means illuminates the display background in a hue which was selected from a store of discrete hue values.

6. The field device as claimed in claim 4, wherein:
   said light-emitting means comprises an array of differently colored light-emitting diodes.

7. The field device as claimed in claim 4, wherein:
   said light-emitting means comprises differently colored light-emitting films.

8. The field device as set forth in claim 1, wherein:
   said external signal is fed to the field device through a communications interface.

9. The field device as claimed in claim 1, wherein:
   said first process data signal represents a first physical or chemical process variable sensed from the automated process.

10. The field device as claimed in claim 1, wherein:
    said second process data signal represents a second physical or chemical process variable.

11. The field device as claimed in claim 1, wherein:
    the field device is installed in a plant implementing the automated process.

12. The field device as claimed in claim 1, further comprising:
    a transducer, wherein:
    said first process data signal is a signal generated by means of said transducer.

13. The field device as claimed in claim 1, wherein:
the field device is selected from a group consisting of level meter, a mass flowmeter, a pH meter, a pressure gage, a limit detector.

14. The field device as claimed in claim 1, further comprising:
a control element, wherein:
said first process data signal is a control signal generated by said control element.

15. The field device as claimed in claim 1, wherein:
the field device is selected from a group consisting of valves and pumps.

16. The field device as claimed in claim 1, wherein:
the field device is selected from a group consisting of a level meter, a mass flowmeter, a pH meter, a pressure gage, a limit detector, a data recording device, a valve and a pump.

17. The field device as claimed in claim 1, wherein:
said external signal representing a second physical or chemical process variable.

18. The field device as claimed in claim 1, wherein:
the field device is connected to a field bus; and
said external signal is transmitted to the field device via said field bus.

19. The field device as claimed in claim 18, wherein:
the field bus connected to the field device is connected to a serial field bus.

20. The field device as claimed in claim 1, wherein:
said external signal is generated by another field device.

21. The field device as claimed in claim 1, wherein:
said display element is implemented in Super Twisted Nematic technology.

22. The field device as claimed in claim 1, wherein:
said display element is implemented in Double Super Twisted Nematic technology.

23. The field device as claimed in claim 1, wherein:
said display element is implemented in Color Coded Super Twisted Nematic technology.

24. A field device with a display for on-site visualization of conditions of an automated process, said display comprising:
a display controller which receives at least a first process data signal and a second process data signal and which at least temporarily provides a state indication signal representing a constellation of states of at least one of the two process data signals; and
at least one of the two process data signals being derived from an external signal generated externally to the field device; and a display element of variable appearance which visually signals via its appearance a constellation of the states of the two process data signals, and which responds to a change in the state indication signal with a significant change in its appearance, wherein:
the field device is installed in a plant implementing said process.

25. The field device as claimed in claim 24 wherein:
said first process data signal representing a first physical or chemical process variable sensed from the automated process.

26. The field device as claimed in claim 25, wherein:
said external signal represents a second physical or chemical process variable.

27. The field device as claimed in claim 24, further comprising:
a transducer, wherein:
said first process data signal is a signal generated by means of said transducer.

28. The field device as claimed in claim 24, wherein:
the field device is selected from a group consisting of a level meter, a mass flowmeter, a pH meter, a pressure gage, a limit detector.

29. The field device as claimed in claim 24, further comprising:
a control element, wherein:
said first process data signal is a control signal generated by said control element.

30. The field device as claimed in claim 24, wherein:
the field device is selected from a group consisting of valves and pumps.

31. The field device as claimed in claim 24, wherein:
the field device is selected from a group consisting of a level meter, a mass flowmeter, a pH meter, a pressure gage, a limit detector, a data recording device, a valve and a pump.

32. The field device as claimed in claim 24, wherein:
said external signal represents a second physical or chemical process variable.

33. The field device as claimed in claim 24, wherein:
the field device is connected to a field bus; and
said external signal is transmitted to the field device via said field bus.

34. The field device as claimed in claim 33, wherein:
said field bus connected to field device is connected to a serial field bus.

35. The field device as claimed in claim 24, wherein:
the external signal is generated by another field device.

36. The field device as claimed in claim 24, wherein:
said display element comprises a light-emitting means of adjustable hue for illuminating a display background; and
said display element responds to the state indication signal by causing said light-emitting means to illuminate the display background in a hue which signals the condition currently being represented by said state indication signal.

37. The field device as claimed in claim 24, wherein:
said light-emitting means illuminates the display background in a hue which was selected from a store of discrete hue values.

38. A field device with a display for on-site visualization of conditions of an automated process, said display comprising:
a display controller which receives at least a first process data signal and a second process data signal and which at least temporarily provides a state indication signal representing a constellation of states of at least one of the two process data signals; and
at least one of the two process data signals being derived from an external signal generated externally to the field device; and a display element of variable appearance which visually signals via its appearance a constellation of the states of the two process data signals, and which responds to a change in the state indication signal with a significant change in its appearance, wherein:
the field device is connected to a field bus; and
said external signal is transmitted to the field device via said field bus.

39. The field device as claimed in claim 38, further comprising:
a transducer, wherein:
said first process data signal is a signal generated by means of said transducer; and said first process data signal represents a first physical or chemical process variable.

40. The field device as claimed in claim 39, wherein:

said external signal represents a second physical or chemical process variable.

41. The field device as claimed in claim 38, wherein:

said external signal is generated by another field device.

42. The field device as claimed in claim 38, wherein:

said display controller at least temporarily provides a value indication signal representing an instantaneous value of one of the two process data signals; and said display element responds to said value indication signal by at least temporarily presenting this signal value in a visually perceptible manner.

43. The field device as claimed in claim 38, wherein:

said first process data signal is derived from a transducer signal generated inside the field device.

44. The field device as claimed in claim 38, wherein:

the field device is selected from a group consisting of a level meter, a mass flowmeter, a pH meter, a pressure gage, a limit detector.

45. The field device as claimed in claim 38, wherein:

said display element comprises a light-emitting means of adjustable hue for illuminating a display background; and said display element responds to said state indication signal by causing said light-emitting means to illuminate the display background in a hue which signals the condition currently being represented by said state indication signal.

46. The field device as claimed in claim 38, wherein:

said light-emitting means illuminates the display background in a hue which was selected from a store of discrete hue values.

* * * * *